Figure 1:
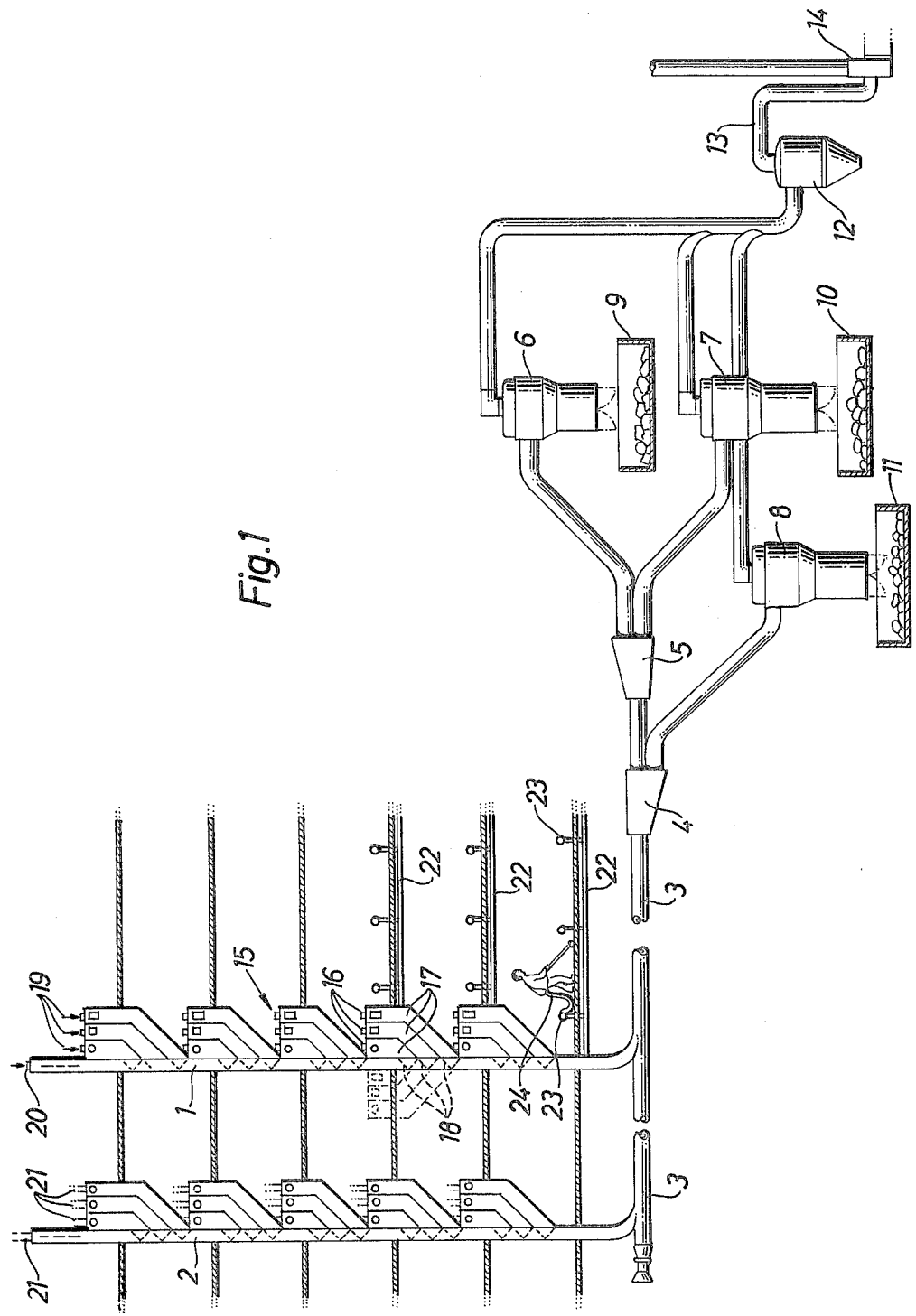

United States Patent [19]

de Feudis

[11] 4,013,551
[45] Mar. 22, 1977

[54] DEVICE FOR SORTING OF GOODS
[75] Inventor: Sergio de Feudis, Nacka, Sweden
[73] Assignee: Aktiebolaget Svenska Flaktfabriken, Stockholm, Sweden
[22] Filed: Jan. 8, 1975
[21] Appl. No.: 539,386
[30] Foreign Application Priority Data
  Jan. 31, 1974  Sweden ............................ 7401308
[52] U.S. Cl. .................................. 209/73; 302/27; 302/28; 193/34; 214/1 L; 209/122
[51] Int. Cl.² .......................................... B65G 51/02
[58] Field of Search .......... 209/73 R, 122; 193/34; 243/1, 16 R; 302/2, 11, 27, 28, 17; 214/1 L, 16 R

[56] References Cited
UNITED STATES PATENTS

| | | | |
|---|---|---|---|
| 273,499 | 3/1883 | Fisher | 193/34 |
| 1,791,488 | 2/1931 | Carroll | 214/1 L |
| 1,886,916 | 11/1932 | Storch | 214/1 L |
| 2,052,597 | 9/1936 | Beckmann | 243/16 R X |
| 2,903,115 | 9/1959 | Kluge | 193/34 |
| 3,490,813 | 1/1970 | Hallstrom | 302/17 |
| 3,507,460 | 4/1970 | Norman et al. | 243/16 |
| 3,675,975 | 7/1972 | Mundinger et al. | 302/27 X |
| 3,826,539 | 7/1974 | Kunz et al. | 302/28 X |
| 3,951,461 | 4/1976 | De Feudis | 302/27 |

FOREIGN PATENTS OR APPLICATIONS

| | | | |
|---|---|---|---|
| 1,223,279 | 2/1971 | United Kingdom | 302/17 |

*Primary Examiner*—Robert B. Reeves
*Assistant Examiner*—Joseph J. Rolla
*Attorney, Agent, or Firm*—Cushman, Darby & Cushman

[57] ABSTRACT

An arrangement for sorting of refuse or laundry into various kinds of goods, comprising a transportation system in which the refuse or laundry is transported in conveyance shafts from a number of depositing places to a common collecting place with separate containers for the various kinds of goods to be collected. Each depositing place comprises a number of storage spaces, one for each kind of goods to be collected and access to these storage spaces is gained through chute doors. The storage spaces are opening in a substantially vertical dumping shaft and each discharge opening is provided with a hatch which can be kept in closed position by means of a locking mechanism. As long as the hatch is closed each storage space will collect the refuse or laundry put into the space through the opening covered by the chute door. When the locking mechanism is disengaged the hatch opens under the influence of the weight of the goods and falls down through the dumping shaft into a substantially horizontal conveyance duct in which the refuse is pneumatically transported to the collecting place with the containers for the different kinds of goods. Alternatively the vertical dumping shaft bifurcates in ducts debouching into the different containers in which the refuse or laundry will fall by gravity. In both cases, however, switching valves are located in the conveyance shaft for distributing the various kinds of goods to be collected to the corresponding containers. The switching valves are operated by a control mechanism also cooperating with the hatch locking mechanisms so that storage spaces for one and the same kind of goods are connected to their corresponding containers.

5 Claims, 2 Drawing Figures

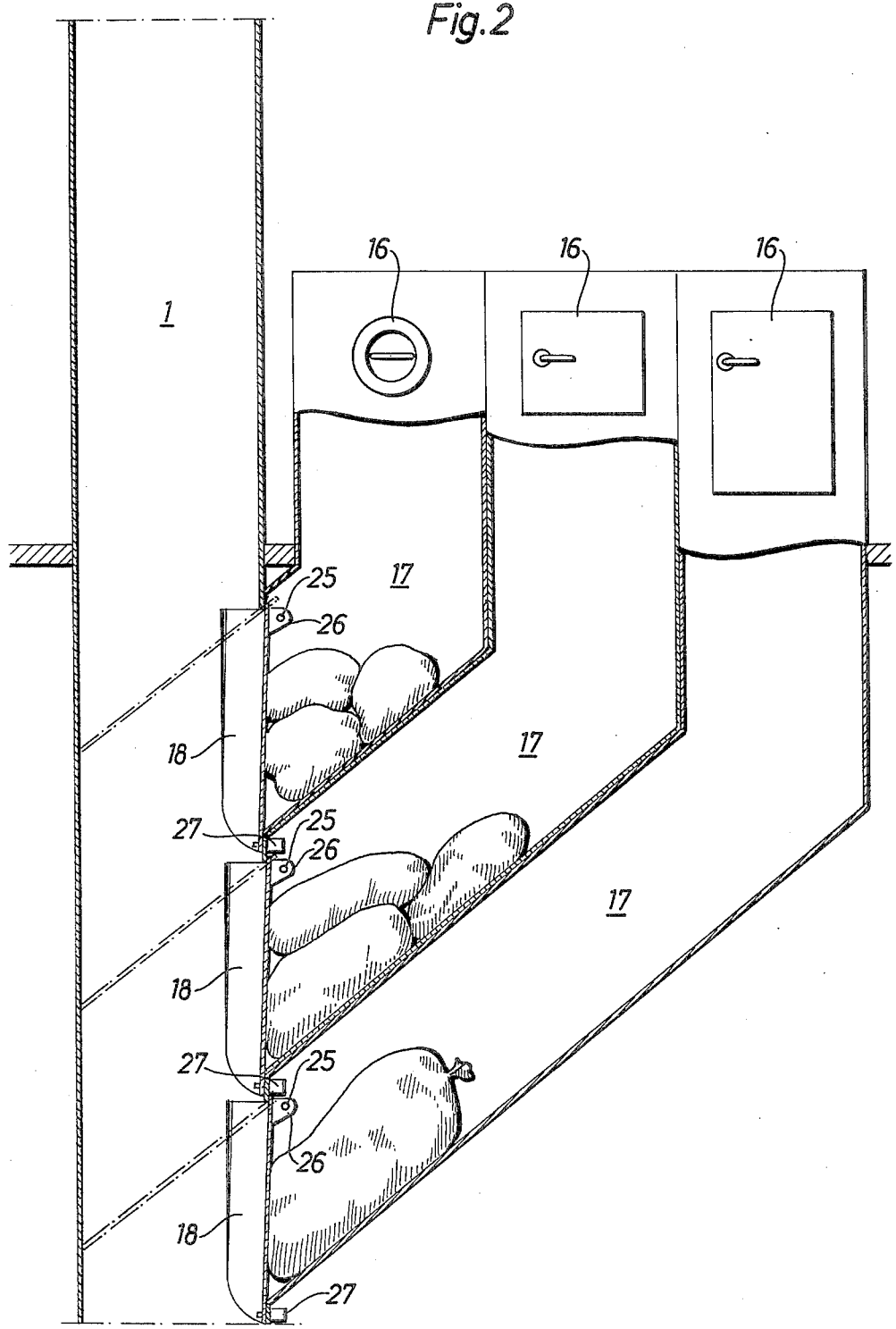

DEVICE FOR SORTING OF GOODS

The present invention relates to a device for sorting goods that are to be conveyed from a number of depositories to a central collecting depot with separate containers for the individual classes of goods, each depository having a number of chutes corresponding to the classes of goods, from which the said goods are conveyed through pipes to the various containers.

The device according to the invention is applicable not only to conventional dumping-chute systems for refuse, laundry, etc., in which a container is arranged below a vertical dumping shaft, but also to pneumatic conveying plants in which the goods are conveyed to the container through a pipe system.

It is already known, for instance from Belgian Pat. No. 803,415, how to utilize a pneumatic pipe conveyance system, comprising a dumping shaft with hatches for the various classes of goods, which are conveyed through a common, mainly vertical dumping shaft from each storey to storage facilities at the bottom of the shaft, the said storage facilities being connected by bottom valves with a mainly horizontal conveyance duct in which the goods are transported through automatically actuated switching valves to the particular container. A system as described implies a considerable improvement in the sorting of waste materials but is unfortunately somewhat complicated as switching valves have to be arranged both in the vertical dumping shaft to achieve correct distribution of the goods to the storage facilities concerned and in the mainly horizontal conveyance ducts in which the goods are to be sent to the correct container. In addition, the switching valves in the vertical dumping shaft must be controllable from each depository, either when a hatch for a particular class of goods is opened or by the person intending to use the dumping chute. The disadvantage of such a system is, naturally, that only one hatch can be opened at a time to avoid the risk of intermingling various classes of waste, which implies that elaborate locking systems have to be installed in multi-storey buildings with a great number of chute doors. Arrangements as described are apt to cause delays if several people intend to use the system simultaneously and it is also necessary to close the chute doors with particular care so that the electric locking of the other, closed doors can be released. Careless shutting of one chute door will thus block the entire chute system and it may take some time before the mistake has been localized and eliminated.

The device according to the present invention serves the purpose of eliminating the disadvantages inherent in the system previously known, thus providing a goods sorting device of great usefulness, which can be utilized in connexion with dumping shafts ending directly in containers or in a pneumatic conveyance system.

This end is attained by a device according to the invention mainly by at least one conveyance shaft common to the various classes of goods being arranged to carry these goods to the containers, by switching valves in the conveyance shaft being so arranged as to distribute the goods to the correct containers, by at least one storage space for each class of goods being arranged immediately inside the corresponding chute door in order that the goods will be collected after being entered through the said door, and by this space being closable by a discharge hatch that allows a certain amount of goods to be collected before the storage space is emptied and which, following release of a locking mechanism, can be opened under the influence of the weight of the goods, which move into the common conveyance shaft and are thence transported to the container concerned.

In addition to the above-mentioned elimination of the disadvantages of the pipe system as described in the above patent the subject matter of the invention offers a number of advantages as compared to that patent.

So, for example, a vacuum will develop in the chute shaft proper of a pneumatic pipe system. Such vacuum can be controlled by means of valves that are fitted either at the dumping openings or in the upper part of the shaft. The air cushion that generally precedes the waste goods during their passage through the shaft, will thus be removed by suction, eliminating the risk of the goods' becoming caught in an oblique position in the shaft, which would then be obstructed. The amount of waste material accumulated in the storage spaces being greater, the mass of the goods falling through the shaft will be greater than according to the system of the above patent, and this will contribute further to lessening the tendency of the goods to becoming caught en route.

According to one adequate embodiment of the invention the cross section of the chute shaft may be made square, thus creating air passages between the falling goods and the corners of the shaft, which will eliminate the development of an air cushion below the goods.

Both the chute door and the discharge hatch may be fitted with vent holes to produce a certain underpressure in the storage space, thus counteracting the formation of offensive odours.

The device according to the invention may in certain cases also be combined with storage shafts at the bottom of the chute shaft. These storage shafts, the volume of which is considerably greater than that of the storage facilities at the depositories, are fitted with bottom valves in the same way as in the pneumatic conveyance system according to Belgian Pat. No. 803,415.

The discharge hatches according to the invention are pivoted at their upper margin on a substantially horizontal axle, the lower part of each hatch being able to swing out into the shaft cavity when being subjected to the impetus of the goods leaving the storage space. To prevent a hatch from being opened by any small amount of waste material, a locking mechanism is fitted at its lower margin, locking the hatch in the closed position and enabling the waste material to enter the common dumping shaft only upon disengagement of the locking mechanism. By this design of the storage facilities the opening of the hatches may be programmed for the purpose of co-ordinating the transports between the storage spaces and the waste containers, preventing simultaneous opening of two discharge hatches, which might result in blocking the passage through the shaft.

An additional advantage of the device according to the invention in comparison with known techniques is that suction pipes for a central dust exhaust plant may be directly connected with the dumping shaft, which will consequently act as a dust-exhaust suction pipe. To achieve the required shaft underpressure in this case, however, it is necessary to close the air vents leading into the shaft, which are normally slightly open as has been explained previously.

One embodiment of the invention, selected here as an example, is described below, reference being made to the appended drawings, of which FIG. 1 shows a pneumatic goods conveying system, comprising sorting devices according to the invention, and FIG. 2 shows a longitudinal section through a number of storage pockets at a depository.

The goods sorting plant depicted in FIG. 1 comprises two substantially vertical dumping shafts 1, 2, leading into a mainly horizontal conveying duct 3, comprising the switching valves 4,5, which distribute the goods over the various coarse separators 6, 7, 8 from which the separated material passes into containers 9, 10, 11. Goods that are not separated out by the coarse separators are passed on to a fine separator 12, from which a pipe 13 leads to the ventilators 14 that maintain the pneumatic conveyance in the system.

In the embodiment just described the dumping shafts 1, 2, are incorporated in a multi-storey building. Each storey has its depository 15 for the goods that are to be transported to the central collection site on which the containers 9, 10, 11 are arranged. At each depository there are a number of chute doors 16, corresponding to the classes of goods to be dumped. Storage pockets 17 for the goods inside the chute doors 16 are designed as containers, each with its main axis directed obliquely downward towards the dumping shaft. The container outlets can be closed by discharge hatches 18, enabling a certain quantity of goods to be accumulated before being discharged to the shaft. The design of the discharge hatches 18 is such as to permit their opening under the influence of the weight of the accumulated goods, which then enter the vertical dumping shaft. To prevent the hatches from being opened by any small amount of waste material that exerts a pressure, each hatch is fitted with an electrically actuated locking mechanism, which is preferably connected to a central control system for opening the discharge hatches. It would also be feasible to arrange the hatches so that they can be actuated from the depository when the goods accumulating in the storage space have reached a predetermined level that can be checked visually from the chute door.

As can be seen from the right-hand dumping shaft 1 in the figure the chute doors may vary in shape and size to facilitate the sorting of the doors at the depository. Obviously, a sorting device according to the invention cannot work properly unless the persons using it follow the instructions for sorting the goods. One way of guiding the sorting is to use chute doors of various shapes and, for instance, to make storage pockets of a larger size for the bulky goods, fitting them with chute doors that enable the bulky waste to be entered without difficulty. By such means the dumping of bulky goods through the smaller size chute doors that obstruct the entering of large objects will be avoided to some extent.

In the system according to the invention the waste goods may be sorted into any arbitrary number of storage spaces as required; the illustration indicates that additional storage pockets may be connected to the dumping shaft on any storey if necessary. For most practical purposes three or possibly four storage pockets would be sufficient to meet the sorting requirements.

To prevent disagreeable odours from spreading around the depository it is possible for instance to perforate the discharge hatches 18 and connect the upper portion of the storage pockets and the common dumping shaft 2 to a ventilating system 21, thus creating a constant current of air through the accumlated waste, which may consequently be stored without giving off any offensive odour. The design of this ventilating system may naturally vary, depending on the circumstances, one embodiment for the dumping shaft being outlined in FIG. 1 in which each storage pocket is fitted with an air throttle valve 19 that is connected to the common shaft, the hatches 18 being airtight in the closed position, and the air inlet 20 for the dumping shaft 1 being automatically adjustable, enabling the downward air current through the said shaft 1 to be varied as required. The particular advantage of this arrangement is that the underpressure in the dumping shaft can be maintained at such level as to enable a central dust exhaust system to be connected to the pneumatic goods conveying plant. The piping 22 for the central dust exhaust system comprises stationary valves 23 to which a flexible vacuum-cleaner hose 24 may be connected. By this means the need for separate risers for the central dust exhaust system is completely eliminated.

The discharge hatches according to the invention are designed in such a way that each hatch 18 is pivoted at its upper margin on a horizontal axle 25, which is supported at its ends by constructive elements that are fixed to the container proper 17. The shape of the discharge hatch 18 coincides in the main with the inner wall of the dumping shaft 1 or 2; the attachment of the hatch to the axle 25 is by braces 26 or similar adequate means. To achieve an efficient closure of the container outlet by the hatch 18, thus preventing goods falling through the shaft from being caught at the said outlet, the upper and lower margins of the hatch are designed to overlap the adjacent edges of the structure that forms the dumping shaft proper, the upper margin of the hatch overlapping the said structure on its outside relative to the shaft and the lower margin overlapping it on the inside.

An electromagnetically actuated pawl 27 at the container outlet engages the lower margin of the hatch, locking the hatch in its closed position until being disengaged by pressing a button or by the hatches' being opened by sequential control from a programmed central unit. The discharge hatches are thus opened by the pressure exerted by the dumped waste goods, each hatch being swung out so that the goods will fall into the shaft. The sequential control prevents more than one hatch of a particular shaft from being opened at the same time, which might cause serious obstruction. The opening of the hatches may also be co-ordinated with the setting of the switching valves 4, 5, which makes it possible to co-ordinate the emptying of the conveying facilities, avoiding unduly repeated resettings of the switching valves and thus greatly contributing to their operational reliability and service life.

I claim:

1. An arrangement for collecting, conveying and sorting material such as refuse or laundry into various kinds of goods, said material being transported in conveyance shafts from a number of depositing places to a common collecting place with separate containers for the various kinds of goods, comprising:

a number of chute doors at each depositing place, the number of doors corresponding to the various kinds of goods being handled;

at least one storage space for each kind of goods being located immediately inside the corresponding chute door in order to collect the goods after being entered through said chute door each storage space ending in a substantially vertical dumping shaft and having a lower sliding surface being directed obliquely downwards towards said dumping shaft;

a discharge hatch for closing a discharge opening of each storage space, said hatch being kept in closed position by means of a locking mechanism, the discharge hatch forming part of an inner wall surface of said substantially vertical dumping shaft, the locking mechanism maintaining the discharge hatch closed and allowing a certain amount of goods to be collected before the storage space is emptied, which occurs at disengagement of said locking mechanism, said discharge hatch being pivoted at its upper margin on a substantially horizontal axis so as to close the discharge opening of the storage space when being at a locked position, the lower part of said discharge hatch being operable to swing out into said dumping shaft to open in response to the force of dumped goods in the storage space to thereby cause the dumped goods to enter the dumping shaft;

said conveyance shafts including a number of said substantially vertical dumping shafts common to the various kinds of goods being entered through said chute doors, and collisted in said storage spaces, each conveyance shaft conveying material from at least two depositing places;

switching valves in said conveyance shafts for distributing the various kinds of goods to the corresponding containers;

means for controlling the disengagement of said locking mechanisms and the position of said switching valves in order to connect said storage spaces for one and the same kind of goods through the conveyance shafts with the corresponding container.

2. An arrangement according to claim 1, wherein the upper and lower margins of said discharge hatch are overlapping the adjacent edges of the structure forming said vertical dumping shaft when said latch is in the closed position;

the upper margin of said hatch overlapping said structure on the outside relative to the shaft and the lower margin overlapping said structure on the inside of said shaft to thereby avoid upward facing abruptly protruding marginal edges at said hatch so that the walls of said dumping shaft and the inner surface of said hatch serve to convey dumped goods smoothly past said hatch.

3. An arrangement according to claim 1, wherein in the locking mechanism is located at the lower margin of said hatch to lock the same in the closed position, said locking mechanism comprising an electromagnetically actuated locking device.

4. An arrangement according to claim 1, wherein depositing places are located on each story of a multi-story building and each dumping shaft ends in a substantially horizontal conveyance duct;

fan means are arranged for conveying the goods through the substantially horizontal conveyance duct to the containers.

5. An arrangement according to claim 4, wherein suction pipes for central vacuum cleaning are connected to the dumping shafts in which said fan means are generating an underpressure.

* * * * *

UNITED STATES PATENT OFFICE
CERTIFICATE OF CORRECTION

Patent No. 4,013,551          Dated March 22, 1977

Inventor(s) Sergio de FEUDIS

It is certified that error appears in the above-identified patent and that said Letters Patent are hereby corrected as shown below:

In the heading:

Item [73], change "Aktiebolaget Svenska Flaktfabriken" to

--AB Svenska Flaktfabriken --.

Column 5, claim 1, line 30, change "collisted" to --collected--

Signed and Sealed this ninth Day of August 1977

[SEAL]

*Attest:*

RUTH C. MASON
*Attesting Officer*

C. MARSHALL DANN
*Commissioner of Patents and Trademarks*